May 5, 1942.                J. E. HAYNES                2,281,577
                          COLLECTOR'S RECORDER
                     Filed Oct. 23, 1939        6 Sheets—Sheet 1
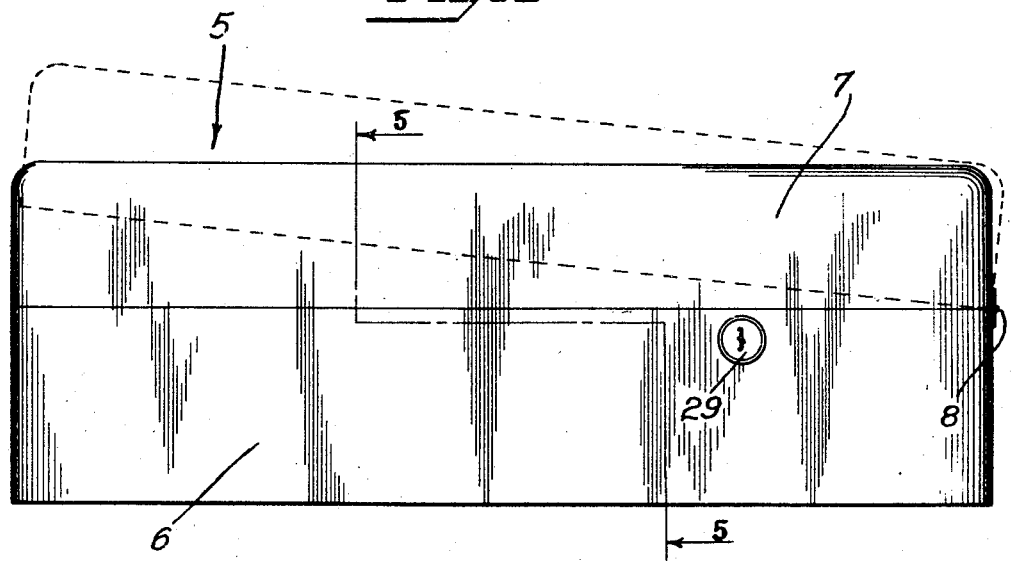
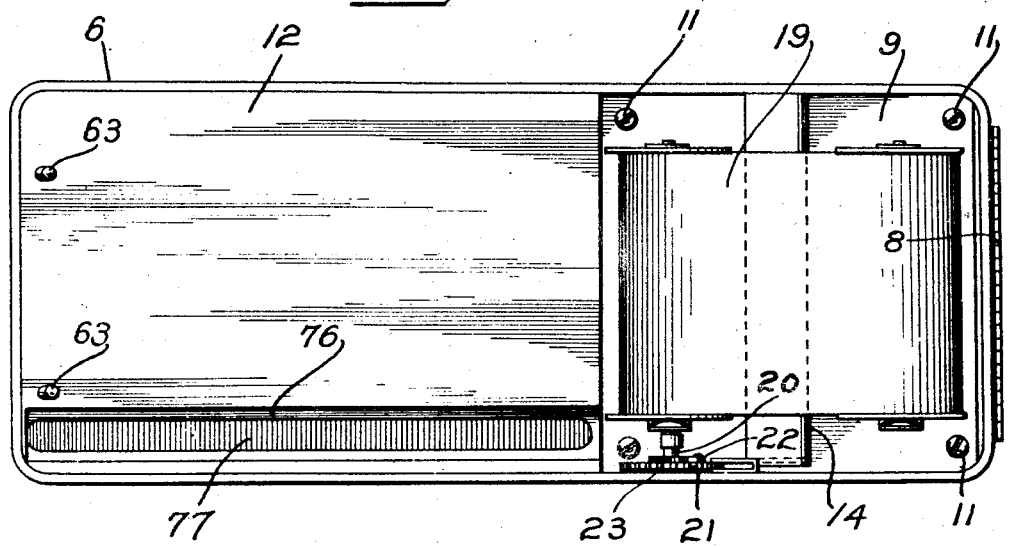
Inventor
James E. Haynes.
By Lacey & Lacey, Attorneys

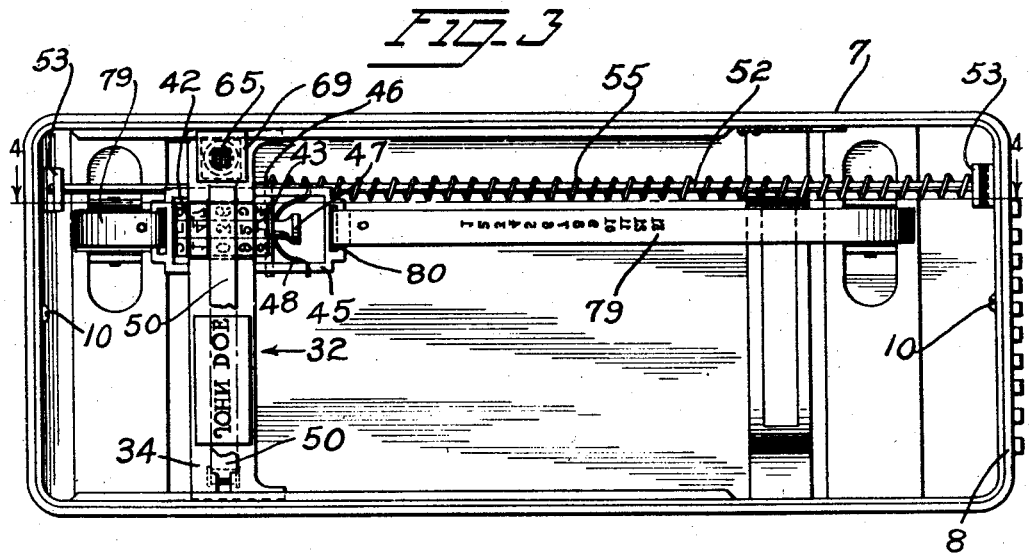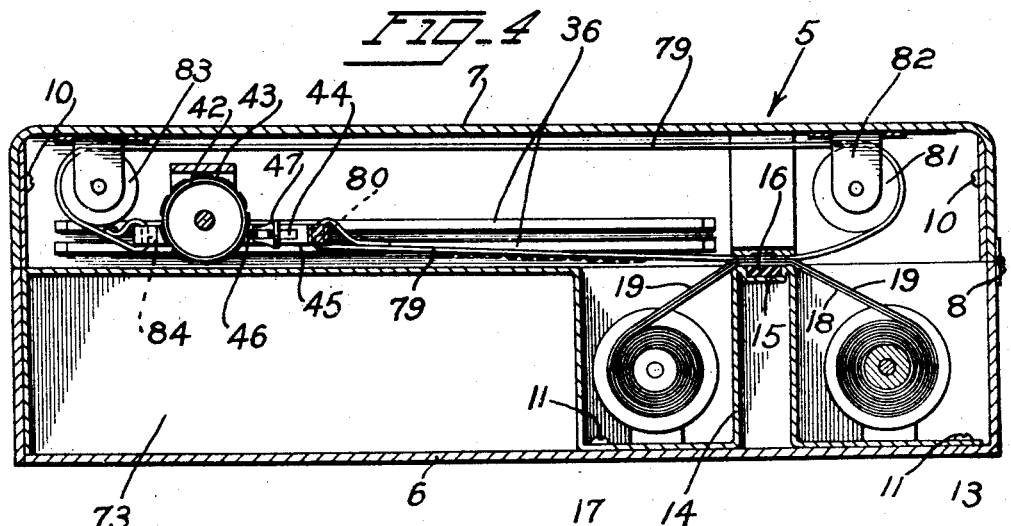

May 5, 1942.  J. E. HAYNES  2,281,577
COLLECTOR'S RECORDER
Filed Oct. 23, 1939  6 Sheets-Sheet 3
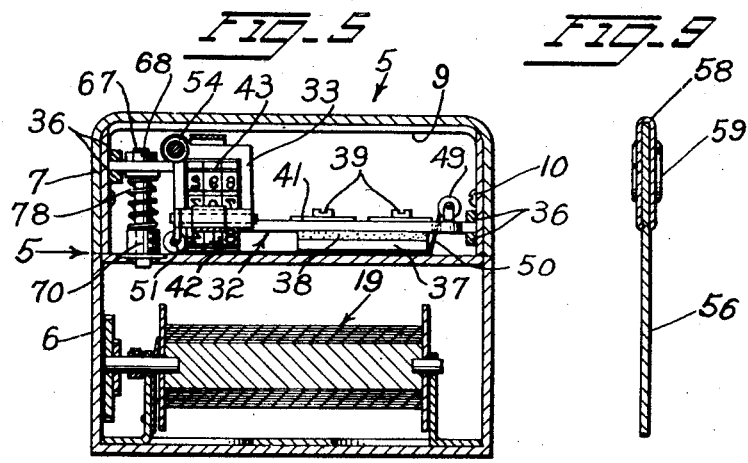
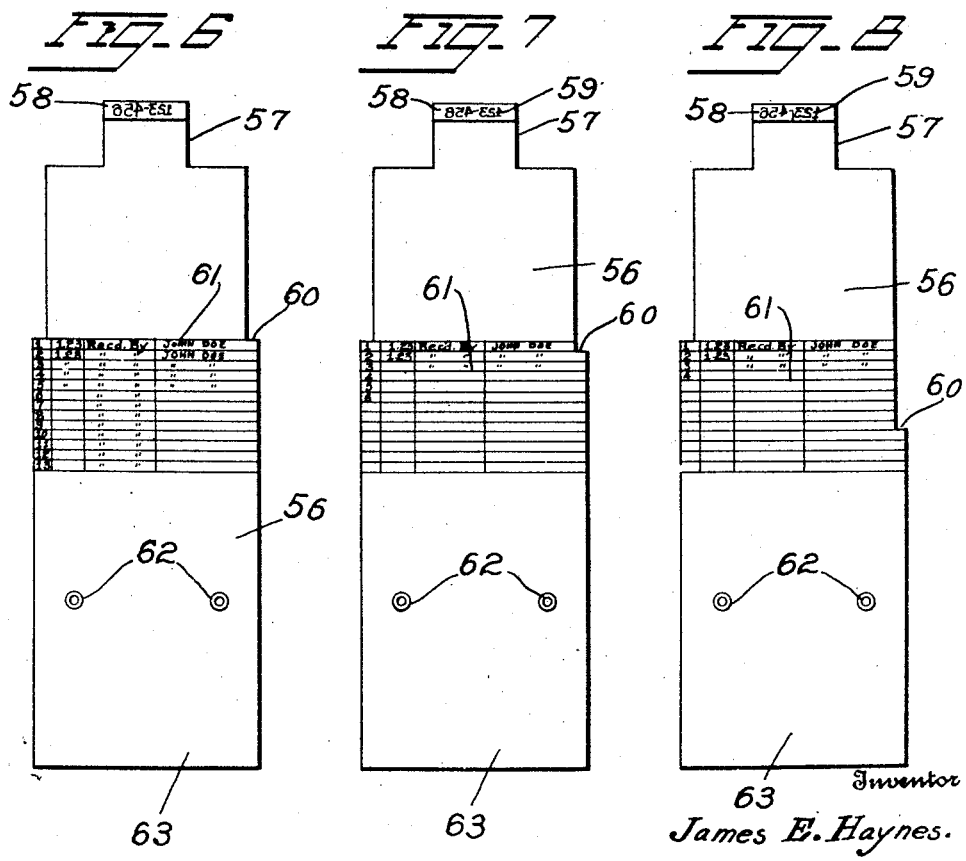
Inventor
James E. Haynes.
By Lacey & Lacey,
Attorneys May 5, 1942.  J. E. HAYNES  2,281,577
COLLECTOR'S RECORDER
Filed Oct. 23, 1939   6 Sheets-Sheet 4
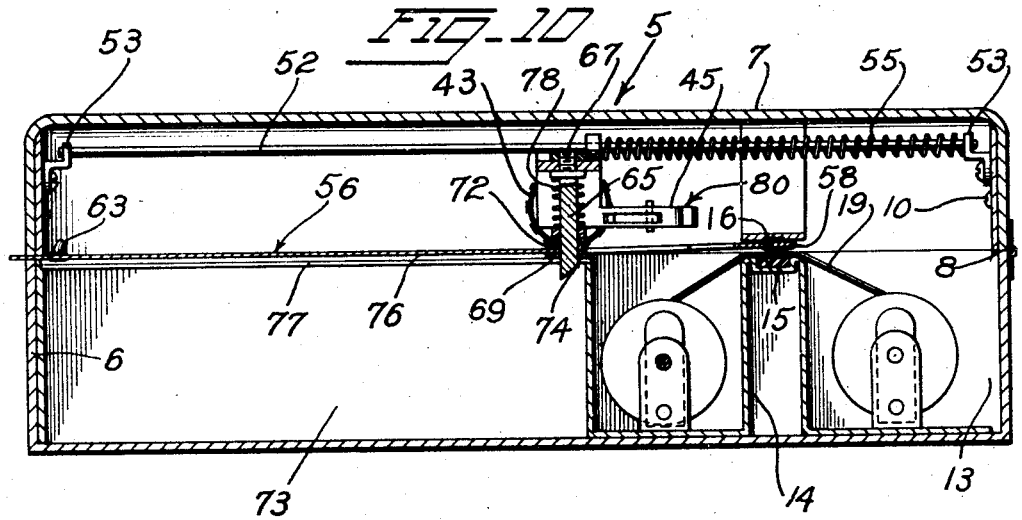
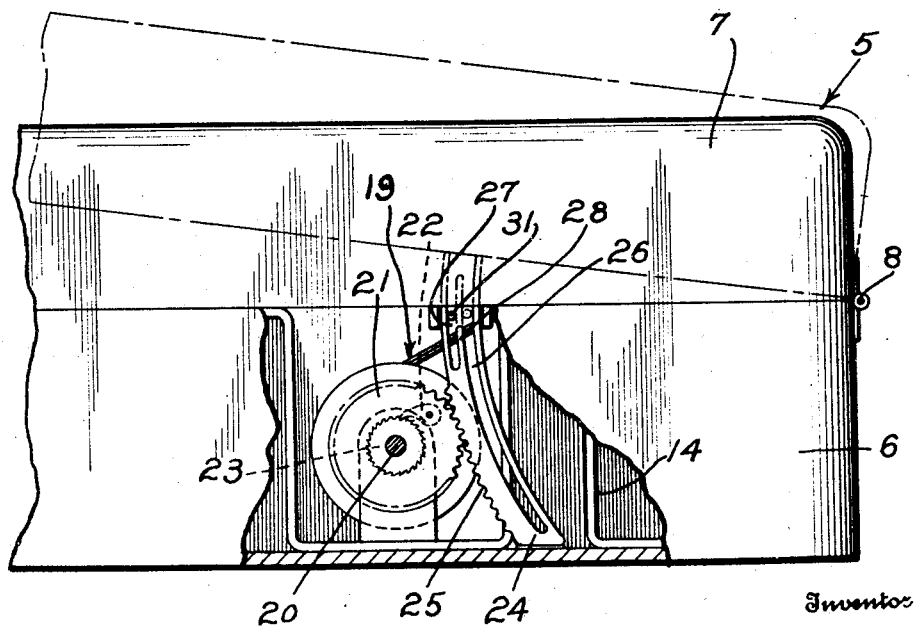
Inventor
James E. Haynes.
By Lacey & Lacey, Attorneys May 5, 1942.  J. E. HAYNES  2,281,577
COLLECTOR'S RECORDER
Filed Oct. 23, 1939   6 Sheets-Sheet 5
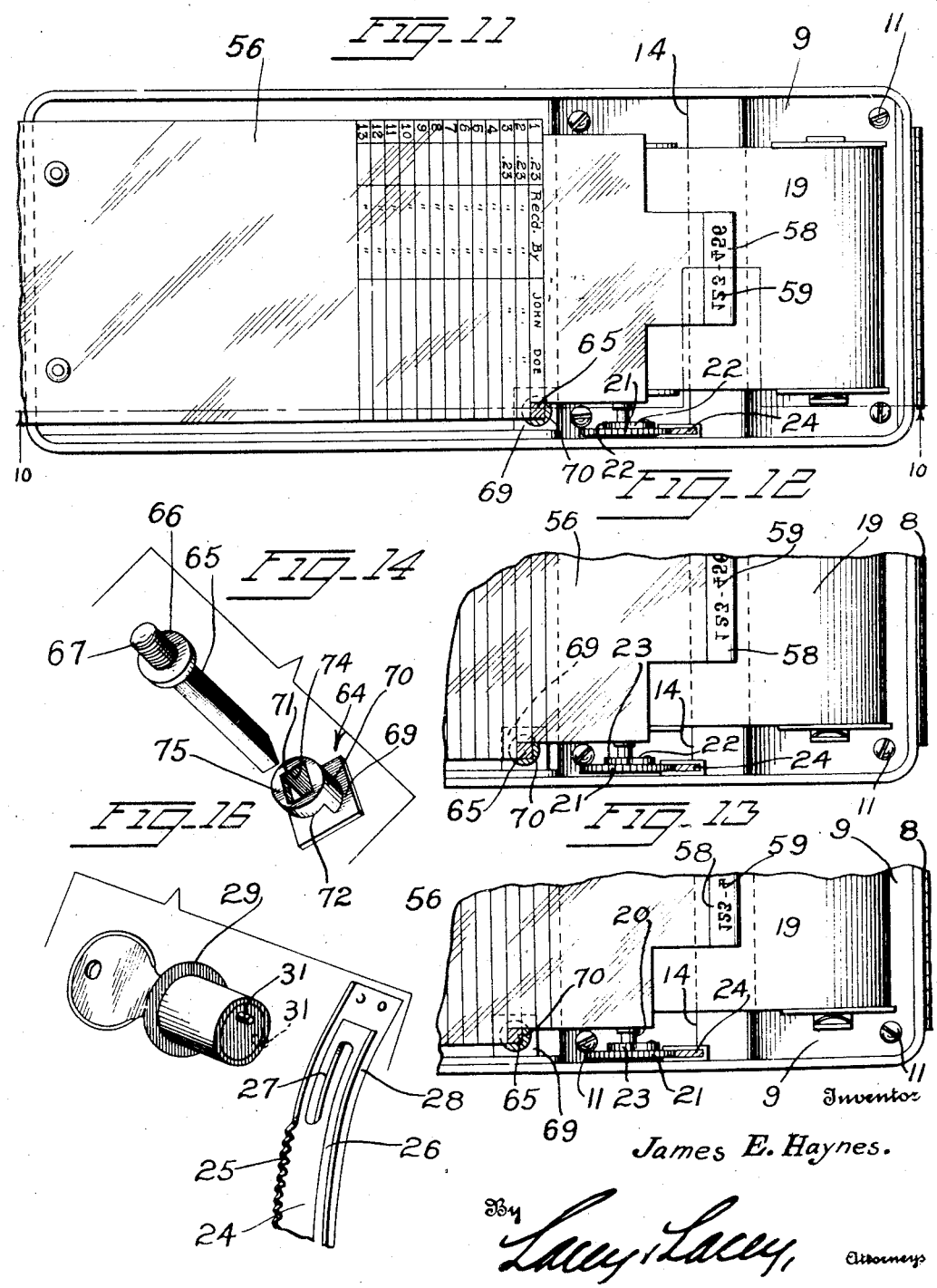
Inventor
James E. Haynes.
By Lacey & Lacey, Attorneys

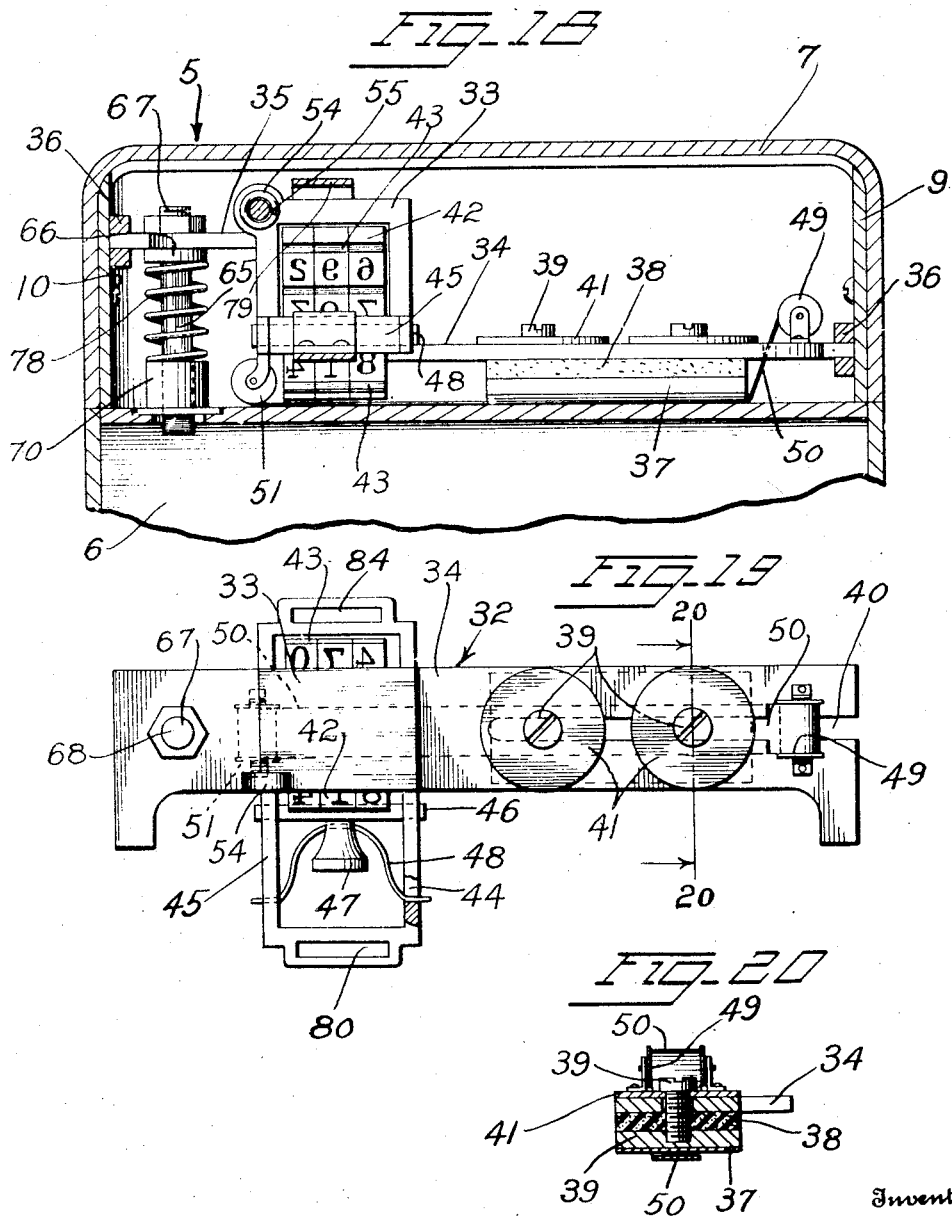

Patented May 5, 1942

2,281,577

UNITED STATES PATENT OFFICE 2,281,577

COLLECTOR'S RECORDER

James Edwin Haynes, Boston, Mass., assignor to Collection Recorder Company, Andover, Mass., a corporation of Massachusetts Application October 23, 1939, Serial No. 300,892

26 Claims. (Cl. 101—288)

This invention relates to printing and recording mechanism and more particularly to a system and machine especially designed for use by insurance agents and others in collecting and recording premium on insurance policies or for tabulating and recording payments of any nature whatever.

The object of the invention is to provide a portable machine of simple, compact and tamperproof construction capable of being readily carried in the pocket by an insurance collector when making his or her weekly premium collections and which will not only print a receipt on the policy holder's premium receipt card for any payment or payments made to the insurance collector but will also make an accurate record of the daily transactions of the collector for use by the home office, thereby dispensing with the usual policy holder's premium receipt book and enabling the home office to keep an accurate check on the daily collections of the insurance agent.

In accordance with my improved system, I provide each insurance collector with a portable printing machine having means for printing indicia on a specially constructed policy holder's premium receipt card and record tape respectively, one or both longitudinal edges of the premium receipt card being provided with a preformed stop or shoulder for governing the printing position of the initial premium payment on said card. The machine is provided with a cutting device operable simultaneously with the indicia printing means to cut or sever the longitudinal edge of the premium card at said shoulder to form a new stop or shoulder which determines the printing position of the next premium payment on the card when said card is again inserted in the machine by the collector to print or record a further premium payment thereon, and this operation is repeated until the number of weekly premium payments made by the policy holder corresponds to the number of lines or spaces on one side of the card, after which said card is reversed and the other side thereof used for recording premium payments in a similar manner. In other words, a new shoulder is formed on the edge of the card by the cutting device each time the card is inserted in the machine and this progressive severance or cutting away of the edge of the card to form successive shoulders produces a longitudinal guide channel of constantly increasing length which insures proper placement of the card in the machine and accurate linear spacing of the premium payment indicia on said card.

I further provide each policy holder with one of these specially constructed premium cards which the collector inserts in the machine each time a premium payment is made by a policy holder, said premium cards each having one end thereof provided with an impression or charge plate bearing on its opposite faces numerals representing the amount of the premium payable weekly by the policy holder and the number of the policy holder's account or the page in the ledger at the home office on which the account is kept for making a notation thereof on a recording tape. One or both surfaces of the premium receipt card is provided with consecutively numbered lines or spaces corresponding to regular weekly premium payments and one or both longitudinal edges of the card provided with a preformed stop or shoulder for actuating a movable type carrier, which carrier, in turn, operates suitable numbering mechanism so that, when the premium card is inserted between the printing surfaces of the machine and lateral pressure is exerted on said printing surfaces, the movable type carrier will print on the policy holder's premium card a receipt, preferably in the name of the collector, and the date the premium payment was actually received by him and simultaneously therewith the charge or impression plate will print on the record tape the ledger number and the amount of the premium due while the numbering mechanism will record on the tape the number of the line or shouldered portion on the card bearing the receipt for the last premium actually paid. As the two sections of the box or casing are pressed together to effect the printing operation, the cutting device will form a new stop shoulder on the edge of the card for engagement with the movable type carrier when said card is again inserted in the machine by the collector to record another premium payment thereon. In this manner a printed premium receipt is provided for the policy holder and an accurate printed record made of all daily transactions of the insurance collector for use by the home office and against which the home office may check to verify the agent's collections and thereby detect any possible shortage or irregularities in his accounts.

Further novel features and advantages will be pointed out in the specification and illustrated in the accompanying drawings, in which:

Figure 1 is a side elevation of a portable printing machine embodying the present invention, the cover of the box or casing in which the printing mechanism is enclosed being shown in dotted lines in partially elevated position to permit the insertion of a premium receipt card therein, Figure 2 is a top plan view of the lower section of the casing or box showing the position of the record tape and the guide for the shoulder cutting device, Figure 3 is a similar view of the upper section of the box or casing showing the construction of the movable type carrier and associated parts, Figure 4 is a longitudinal sectional view taken on the line 4—4 of Figure 3, both the upper and lower sections of the box being illustrated, Figure 5 is a vertical sectional view taken on the line 5—5 of Figure 1, Figure 6 is a plan view of one of the reversible premium receipt cards, Figure 7 is a similar view showing the position of the stop or shoulder after the receipt for the first premium payment has been recorded thereon, Figure 8 is a similar view showing the position of the stop or shoulder after several premium payments have been recorded on the card, Figure 9 is a detail sectional view of one end of the card and showing how the charge or impression plate is secured thereto, Figure 10 is a longitudinal sectional view taken on the line 10—10 of Figure 11, Figure 11 is a plan view of the lower casing section showing a premium record card inserted in the machine with the charge or impression plate in printing position and the cutting device removing a portion of the card to form a shoulder in alinement with the space on the card indicating the first premium payment, Figure 12 is a detail plan view showing the position of the cutting device when making a second stop or shoulder opposite the space for the second premium payment on the card, Figure 13 is a similar view showing the position of the cutting device after several premium payments have been made, Figure 14 is a perspective view of the coacting elements constituting the shoulder cutting device detached, Figure 15 is a side elevation, partly in section, showing the rack and pinion mechanism for rotating the record take and the locking mechanism associated therewith, Figure 16 is a perspective view of a portion of the rack and cylinder lock detached, Figure 17 is an enlarged detail sectional view of the pad carrying platen showing a premium payment card in position thereon, Figure 18 is an enlarged view of the movable type carrier shown in Figure 5, Figure 19 is an enlarged top plan view of the movable type carrier detached, and Figure 20 is a vertical sectional view taken on the line 20—20 of Figure 19.

Portable collector's box and record tape mechanism

In carrying my improved premium collecting and recording mechanism into effect, I provide a box-like casing or housing 5 comprising a relatively stationary lower section 6 and a movable upper section or cover 7 pivotally connected by a suitable hinge 8 to allow the forward portion of the cover to be swung upwardly to permit the insertion of a premium receipt card.

Disposed within the box or casing 5 is a frame-work or chassis 9 on which is mounted the printing and recording mechanism hereinafter referred to, said chassis being preferably formed in two sections, one of which is detachably secured to the cover portion 7 of the box by screws or similar fastening devices 10 and the other chassis section being detachably secured to the lower section 6 of the box by similar fastening devices 11 so as to permit the chassis sections and the mechanism mounted thereon to be inserted within and removed from the box as a unit. The lower chassis section is formed with a table or platen 12 and spaced compartments 13 separated by a hollow intermediate partition or platen 14, the upper end of which is countersunk to form a seat 15 for a yieldable pad 16.

Mounted on suitable rollers 17 journaled in the compartments 13 is a record tape 18 including a carbon sheet 19, said record tape and carbon sheet being movable over the upper surface of the pad 16 as the tape travels from one roller to the other, as best shown in Figure 4 of the drawings.

Loosely mounted on the shaft 20 of one of the rollers 17 is a gear wheel 21 having a pawl 22 pivotally mounted thereon and adapted to engage the teeth of a ratchet wheel 23 fixed to said shaft so as to permit rotation of the shaft 20 and the roller 17 in one direction only. Secured to the cover section 7 of the box or casing is a curved depending rack bar 24 having its convex edge formed with teeth 25 which mesh with the teeth on the gear wheel 21 when the cover 7 of the box is moved to closed position. The rack bar 24 is provided with spaced vertically disposed slots 26 and 27 of different lengths separated at their upper ends by a dividing member 28.

Mounted in one wall of the stationary section 6 of the box is a key operated lock 29 including a rotating cylinder 30 having an actuating pin 31 projecting longitudinally therefrom and movable by the key within either of the slots 26 and 27. When the key is turned to bring the pin 31 within the short slot 27, the upward or opening movement of the cover section of the box will be limited by engagement with the lower wall of the slot 27, and when the key is actuated to turn the pin within the long slot 26, the cover section of the box may be swung upwardly to a full open position at right angles to the lower section 6 so as to permit access to the mechanism within the box. It will thus be seen that on the upward or opening movement of the cover section 7, the rack 25 by engagement with the gear wheel 21 will rotate the adjacent drum 17 so as to feed the record tape from one drum to the other and on the downward or closing movement of the cover section 7, the pawl 22 will ride idly over the teeth of the ratchet wheel 23 without effecting any movement of the record tape. It will, furthermore, be noted that this pin and slot construction permits setting of the device so that the collector can open the cover only a sufficient distance to permit the insertion of a premium card within the box, thus rendering the device tamper-proof. When the collector turns in the box at the home office at the close of a working day, the person at the home office having charge of the key to fit the box can readily obtain access to the interior of said box for the purpose of removing and renewing the record tape or for any other purpose by merely inserting the key in the lock 29 and rotating the cylinder 30 until the pin 31 enters the slot 26 and in which position the cover 7 may be moved to a full open position, as previously stated.

Movable type carrier

Slidably and yieldably mounted within the cover section 7 of the box or casing is a movable type carrier 32 comprising a box-like intermediate portion 33 having arms 34 and 35 of different lengths extending laterally therefrom and slidably mounted in guides 36 secured in any suitable manner to the adjacent chassis section. Secured to the long arm 34 is an impression plate 37 on which is stamped or embossed the name of the insurance collector having charge of the box, and interposed between the impression plate 37 and the arm 34 is a yieldable pad 38, the parts being secured together by screws 39 extending through a longitudinal slot 40 formed in the arm 34 with the heads of the screws engaging disks or washers 41, as best shown in Figures 18 and 19 of the drawings. By mounting the impression plate 37 on the arm 34 in this manner, said impression plate may be adjusted laterally with respect to the side walls of the cover section so as to properly center said impression plate relative to the premium payment card.

Mounted for rotation in the box-like intermediate portion 33 of the movable type carrier are a plurality of disks 42 bearing peripheral numerals corresponding to the days or weeks of the month for printing on the premium card the time any particular premium is paid. The rotating disks 42 are provided with transversely disposed registering grooves 43, and slidably mounted in longitudinal slots 44 formed in an auxiliary frame 45 is a locking bar 46 for holding the disks 42 against rotation after said disks have been manually set to print any particular day or week. Connected with the locking bar 46 is a finger-piece 47 and extending through said finger-piece and secured to the auxiliary frame 45 is a leaf spring 48 which serves to normally and yieldably hold the locking bar 46 within a selected slot 43 of the dating disks.

Mounted on the upper surface of the arm 34 is a roller 49 to which is attached one end of an inking ribbon 50, the other end of said ribbon being secured to a similar roller 51 mounted on the intermediate portion 33 of the movable type carrier. The inking ribbon 50 extends over the lower surface of the impression plate 37 and also across the printing surfaces of the rotating disks 42 for the purpose of supplying ink to said parts during the printing operation. Extending longitudinally within the cover section 7 is a guide rod 52 having its opposite ends secured to suitable supporting brackets 53 fastened to the cover chassis and its intermediate portion extending loosely through a perforated lug or eye 54 formed on the intermediate portion 33 of the frame 32. Surrounding the rod 52 and interposed between the guiding eye 54 and the adjacent supporting bracket 53 is a coiled spring 55, the purpose of which is to normally and yieldably hold the movable type carrier in extended position. That is to say, with the carrier disposed adjacent the forward end of the box or casing, said carrier being movable rearwardly of the casing against the tension of the spring 55 by engagement with a premium receipt card which will now be described.

Premium receipt card

The premium receipt card which may be formed of relatively stiff paper or other suitable material is indicated by the numeral 56 and comprises an elongated body portion having one end thereof formed with a reduced tongue 57, to the free edge of which is secured a charge or impression plate 58. This impression plate 58 preferably extends the entire width of the tongue 57 and is bent into substantially U-shape with the legs thereof bearing against opposite faces of the tongue 57 and to which they are secured in any suitable manner, as best shown in Figure 9 of the drawings. Each leg of the plate 57 is stamped, embossed or otherwise provided with indicia or numerals 59 representing the weekly amount of premium due by the policy holder and the number of his or her account or the number of the page in the ledger at the home office in which the account is kept. In the present instance, the numerals 456 represent the ledger number and the numerals $1.23 represent the amount of each weekly premium payment. Each premium card 56 is cut away to form transversely alined stops or shoulders 60 and printed on each side of the card below the shoulders 60 are a series of consecutively numbered transverse lines or spaces 61, corresponding to weekly premium payments due by the policy holder and on which lines or in which spaces is printed by the collector a receipt for the amount of premium paid together with the date of payment. The wide ends of the premium cards 56 are provided with spaced openings 62 adapted to receive stop pins 63 projecting upwardly from the platen or table 12, and these pins are so arranged that, when the openings in the card register with the pins, the charge or impression plate 58 will be in printing position over the platen 14. The openings 62 are spaced inwardly from the adjacent end of the card 56 to form a terminal gripping portion which normally projects outside of the box to facilitate placement of the card within or removal of said card from the box.

Shoulder cutting device

Associated with the movable type carrier is a notch or shoulder cutting device comprising relatively stationary and movable elements 64 and 65, one of which constitutes a punch and the other a cutting die to receive said punch. The movable element or punch 65 is angular in cross section and is provided at its upper end with a shoulder 66 defining a threaded portion 67 which extends through a correspondingly threaded opening in the short arm 35 of the movable type carrier frame for engagement with a clamping nut 68. The lower member 64 of the cutting mechanism comprises a substantially rectangular plate or head 69 having a cylindrical boss 70 secured to or formed integral therewith and provided with an angular socket 71 adapted to receive the adjacent end of the punch 65. The lower portion of the boss 70 is cut away, as indicated at 72, to permit the insertion of the shouldered portion of the premium card 56 and the center of the plate 69 is provided with an opening to permit the discharge of cut-out portions of the card into a receptacle 73 in the lower section of the box designed to receive the same. The rear wall 74 of the boss forms a stop or abutment for engagement with the shoulder 60 of the premium card while the free edge 75 of said wall forms a guide for the adjacent longitudinal edge of the card at said shoulder. The table or platen 12 is provided at one side thereof with a longitudinally disposed seat 76 adapted to receive the rectangular head or plate 69 of the cutting element and in which it is free to slide as the movable type carrier travels back and forth over said table, there being an elongated opening 77 formed in the base of the seat 76 and through which the cut-out portions of the card pass into the compartment 73, as previously stated. Surrounding the punch member 65 is a coiled spring 78 having one end thereof secured to the shoulder 66 and its other end secured to the boss 70, said spring serving to normally and yieldably hold the plate 69 within the seat 76 regardless of the position of the movable type carrier. When the lid of the box is partially opened, the lower end of the punch or cutter 65 will clear the slot 72 so as to allow the insertion of the shouldered portion of a card in said slot and when the lid or cover 7 is moved to closed position, the punch 65 will move downwardly with the lid so as to cut or sever the card at the shouldered portion thereof. In other words, the tension of the spring 78 is such that, when the cover 7 of the box is in partially opened position, the plate 69 will be yieldably held to its seat 76 while the punch element 65 will be elevated to allow a card to enter the opening 72 in the boss 70 and when the lid of the cover is moved to closed position the spring 78 will be compressed and the cutting element 65 moved downwardly within the socket of the boss 70 to effect cutting of the card, as will be readily understood. When the cover of the box is moved to a full open position, the parts 65 and 69 will, of course, be moved as a unit to elevated position.

*Line numbering mechanism for home office record tape*

As a means for printing on the record tape for the use of the home office, the number of the line or space on the premium card bearing the collector's name, or, in other words, the line on which the amount of premium paid is receipted, I provide a belt 79, the printing surface of which is provided with a series of raised numbers, preferably corresponding in sequence to the numbers opposite the lines or spaces on the premium receipt card representing weekly payments. One end of the belt 79 is fastened in a loop 80 on the adjacent end of the auxiliary frame 45 and is thence extended over the pad 16 of the platen 14 for engagement with a guide roller 81 mounted in brackets 82 depending from the rear portion of the cover or chassis of the box. The belt 79 is thence extended over a similar roller 83 and is attached to a corresponding loop 84 secured to the other end of the auxiliary frame 45, as best shown in Figure 4 of the drawings. It will thus be seen that as the movable type carrier slides longitudinally within the box or casing a corresponding movement will be imparted to the belt 79 so as to bring the numerals on said belt successively in registration with the carbon sheet of the record tape for printing on said record tape the number of the receipted line on the premium card. The belt 79 is at all times kept under the proper tension by the action of the spring 55.

*Operation*

As previously stated, each collector is provided with a box or casing, and before leaving the home office, the locking mechanism is adjusted with the key by the proper official in charge of the boxes so that the lid or cover of the box can be opened only a sufficient distance to permit the insertion of a premium card and thus render the box tamper-proof. When the box is given to the collector, the movable type carrier is yieldably supported at the forward or opening end of the box by the spring 55. Upon making a collection, the insurance agent partially elevates the cover 7 and inserts the policy holder's premium card therein with the eyes 62 engaging the pins 63, and in which position the impression or charge plate 58 will register with the platen 14 above the recording tape 19, as best shown in Figure 10 of the drawings. As the premium card is moved rearwardly within the casing, prior to fastening the same with the pins 63, the edge of the card in advance of the shoulder 60 will bear against the vertical guide 75 of the cutting mechanism and when the shoulder 60 engages the rear wall 74 of the boss 70, the receipting plate 37 and dating numerals on the rotating disks will register with line or space 1 on the premium card. A continued rearward movement imparted to the premium card will cause the shoulder 60 on the card to engage the wall or abutment 74 and force the movable carriage rearwardly against the tension of the spring 55 until the charge plate registers with the platen beneath the record tape and in which position it is held from dislacement by the pins 63 fitting within the openings in the card, as previously stated. As the type carrier moves rearwardly, the numeral carrying belt 79 will rotate on the rollers 81 and 83 so as to bring the numeral thereon corresponding to line 1 on the card in position over the platen 14, it being, of course, understood that the numerals on the belt 79 will be so positioned thereon as to successively print on the record tape the number of the line on the record card on which the last payment was made. During this operation the cutting member or punch 34 will be elevated above the boss 70 to permit the insertion of the card in the slot 72 and the rectangular portion 69 of the cutting mechanism will slide freely in the seat 76 as the carriage moves rearwardly. By now pressing downwardly on the cover section 7 of the box, the charge plate 58 will print on the record tape the amount of the premium, the ledger number and the number of the line on the premium card where the last payment is receipted and at the same time the plate 37 and the rotating disks 42 will print on the card opposite the numeral 1 the collector's name and the date of payment.

When the lid or cover of the box is forced downwardly, the cutting element or punch 34 will cut a new shoulder 60 in the card opposite the receipted line or space thereon so that, when the card is again inserted in the machine, the new shoulder will aline the receipt printing mechanism with the next space on the card. In other words, each time a premium card is inserted in the machine, indicia is printed on the card and record tape, respectively, and a new shoulder is formed on the card, the position of the shoulder on the card governing the rearward movement of the movable type carrier. As the edge of the card is progressively cut away to form new shoulders thereon, that portion of the card in advance of the last shoulder by engagement with the edge 75 of the boss will guide said card on the platen or table so as to insure proper placement of the card. When the premium card is removed from the box, the tension of the spring 55 will automatically return the movable type carrier back to its original forward position ready for engagement by another card when inserted in the box. After all of the lines or spaces on one face of the card have been receipted, the card is turned over and inserted in the box or casing in reverse position so as to permit the recordation of premium payment receipts on said reverse side of the card and the formation of shoulders thereon in the manner previously described. When the collector turns in his box at the home office after making his daily collection, the person having charge of the key inserts the same within the cylinder lock and rotates the pin 31 until it enters the long slot 26 and in which position the cover may be moved upwardly to full open position, thus enabling said person to remove the record tape 19 and compare the indicia thereon with the amount of money turned in by the collector so as to provide an accurate check on the agent's collections and thereby detect any possible shortage or irregularities in his or her accounts.

While the device is specially designed for use by insurance agents in making and recording weekly premium payments, it will, of course, be understood that said device may be used with equally good results for tabulating and recording payments of any nature whatever. It will further be understood that the boxes may be made in any desired size and shape and the position of the printing, recording and cutting mechanism housed therein changed at will, the essential feature of the invention residing in providing a tamper-proof portable box having means for simultaneously recording weekly premium payments on a policy holder's card and making a record of the collector's transactions on a recording tape for use by the home office.

Having thus described the invention, what is claimed as new is:

1. A machine of the class described including a casing adapted to receive a payment card, a type carrier mounted within the casing and movable to a selected printing position by engagement with the card when said card is inserted within the casing and moved to a predetermined position, and means for actuating the type carrier to print indicia on said card.

2. A machine of the class described including a type carrier and a support therefor, the type carrier being adapted for engagement with a payment card and movable to a selected printing position on the support by engagement with the card when said card is moved to a predetermined position, the type carrier being actuated to print indicia on said card.

3. A machine of the class described including a casing adapted to receive a payment card having a preformed stop, a type carrier reciprocably mounted within the casing and movable to a selected printing position by engagement with the stop on the card when said card is inserted within the casing and moved to a predetermined position, and means for actuating the type carrier to print indicia on said card.

4. A machine of the class described including a casing adapted to receive a payment card having a preformed stop, type and a type carrier therefor reciprocably mounted within the casing and movable to a selected printing position by engagement with the stop on the card when said card is inserted within the casing and moved to a predetermined position, a shoulder cutting device having a card stop associated therewith, and means for actuating the type to print indicia on said card and operate the cutting device to form a stop shoulder on the card upon each insertion of the card within the casing to a position in contact with said card stop.

5. A machine of the class described comprising a sectional casing adapted to receive a reversible payment card, one end of the card being provided with an impression plate bearing printing indicia and one longitudinal edge of the card being formed with a stop shoulder, recording mechanism including a platen carried by one section of the casing and adapted to register with the impression plate on the card, a movable type carrier slidably mounted in the other casing section and normally and yieldably held at the forward end of the casing, a belt operatively connected with the movable carrier and provided with raised numerals movable over the platen, a receipt impression plate forming a part of the movable carrier, dating disks mounted for rotation on said carrier, a cutting device yieldably supported on the carrier and including coacting elements, one of which is provided with a slot and rear wall constituting an abutment for engagement with the shoulder on the card whereby said shoulder will impart a rearward movement to the type carrier when the card is inserted within the casing, and means for simultaneously actuating said recording mechanism and the type on the carrier to print said indicia on a record tape and to print said type on said card and simultaneously operate the cutting device to form a new shoulder on the card when the casing sections are pressed together.

6. A machine of the class described including a casing adapted to receive a payment card having a preformed stop, a type carrier reciprocably mounted within the casing and normally and yieldably supported near one end of the casing, said type carrier being movable to a selected printing position by engagement with the stop on the card when said card is inserted within the casing and moved to a predetermined position, means for actuating the type carrier to print indicia on said card, and means for returning the type carrier to normal position.

7. A machine of the class described including a casing adapted to receive a payment card provided with a preformed stop, a type carrier reciprocably mounted within the casing and normally and yieldably supported near one end of said casing, a cutting device carried by the type carrier, said type carrier being movable to a selected printing position by engagement with the stop on the card when said card is inserted within the casing and moved to a predetermined position, means for actuating the type carrier to print indicia on said card and simultaneously actuate the cutting device to form a new stop on the card, and means for automatically returning the type carrier to normal position.

8. A machine of the class described including a casing adapted to receive a payment card having printing indicia and a preformed stop shoulder, a type carrier slidably mounted within said casing and normally and yieldably supported in inoperative position, a notching cutter carried by the type carrier, said type carrier being movable to a selected printing position by engagement with the stop shoulder on the card when said card is inserted within the casing and moved to a predetermined position, means for actuating the type carrier to print indicia on said card and for actuating the printing indicia of the card to print on a record tape and simultaneously actuate the notching cutter to form a new stop shoulder on the card, and means for automatically returning the type carrier to inoperative position after each printing operation.

9. A machine of the class described including a casing adapted to receive a payment card having printing indicia and a preformed stop shoulder, a reciprocating type carrier slidably mounted within the casing for printing indicia on said card and normally and yieldably supported in inoperative position, a notching cutter carried by the type carrier, a platen, line numbering printing mechanism operatively connected with the type carrier and movable over said platen, the shoulder on said card when inserted within the casing by engagement with the notching cutter serving to move said type carrier and line numbering mechanism to a selected printing position, means for actuating the type carrier to print indicia on the card and for actuating the numbering mechanism to print on a record tape and simultaneously actuate the notching cutter to form a new stop shoulder on the card, and means for automatically returning the type carrier to inoperative position when the card is withdrawn from said casing.

10. A machine of the class described including a casing adapted to receive a card having printing indicia associated therewith, type and a carrier therefor reciprocably mounted in the casing and movable to a selected printing position by engagement with a portion of the card when said card is inserted within the casing and moved to a predetermined position, recording mechanism within the casing, and means for simultaneously actuating said recording mechanism and said type to print said indicia on a record tape and to print said type on said card at a position determined by the engagement between said portion of the card and said movable carrier.

11. A machine of the class described including a casing adapted to receive a card having printing indicia associated therewith, type and a carrier therefor reciprocably mounted in the casing and movable to a selected printing position by engagement with a portion of the card when said card is inserted within the casing and moved to a predetermined position, a shoulder cutting device having a card stop associated therewith, recording mechanism within the casing, and means for simultaneously actuating said recording mechanism, type, and cutting device to print said indicia on a record tape and to print said type on said card and form a stop shoulder on the card upon each insertion of the card within the casing to a position in contact with said card stop whereby the card indicia is recorded on the tape and the type impression is recorded on the card in a new position for each reinsertion of the card.

12. A machine of the class described comprising a casing having a movable cover and adapted to receive a payment card having printing indicia associated therewith, type and a carrier therefor reciprocably mounted in the casing and movable to a selected printing position by engagement with a portion of the card when said card is inserted within the casing and moved to a predetermined position, recording mechanism within the casing, a notching cutter, means for simultaneously actuating said recording mechanism and said type to print said indicia on a record tape and print said type on said card and during the same operation actuate the notching cutter to form a stop shoulder on the card when the cover is moved to closed position, and means including a key actuated lock for limiting the upward movement of the cover when the key is turned in one direction and for permitting full opening movement of the cover when the key is turned in another direction.

13. A machine of the class described comprising a casing having a movable cover and adapted to receive a payment card having printing indicia associated therewith, type and a carrier therefor reciprocably mounted in the casing and movable to a selected printing position by engagement with a portion of the card when said card is inserted within the casing and moved to a predetermined position, recording mechanism within the casing, a notching cutter, means for simultaneously actuating said recording mechanism and said type to print said indicia on a record tape and print said type on said card and during the same operation actuate the notching cutter to form a stop shoulder on the card when the cover is moved to closed position, a member depending from the cover and provided with relatively long and short slots, and a key actuated lock including a pin movable into the short slot for limiting the opening movement of the cover and movable into the long slot to permit full opening movement of said cover.

14. A machine of the class described comprising a casing having a movable cover and adapted to receive a payment card having printing indicia associated therewith, type and a carrier therefor reciprocably mounted in the cover, a shoulder cutting device on the type carrier, recording mechanism including a gear wheel and pawl and ratchet mechanism mounted in the casing, means for simultaneously actuating said recording mechanism and the type to print said indicia on a record tape and to print said type on said card and during the same operation actuate the cutting device to form a stop shoulder on the card when the cover is moved to closed position, a rack bar depending from the cover and engaging the pawl and ratchet mechanism for moving the record tape when the cover is moved to partially open position, said rack bar being provided with slots of different lengths, and a key actuated lock mounted on the casing and provided with a pin movable into either slot for governing the opening movement of said cover.

15. A machine of the class described comprising a casing adapted to receive a shouldered payment card having printing indicia associated therewith, type and a type carrier therefor reciprocably mounted in the casing and movable to a selected printing position by engagement with a portion of the card when said card is inserted within the casing and moved to a predetermined position, recording mechanism including a platen, a spring operatively connected with the type carrier for holding said carrier normally in a forward position, a line numbering device operatively connected with the type carrier and movable over the platen, said type carrier being movable rearwardly of the casing by engagement with the shoulder on the payment card, a cutting device carried by the type carrier, and means for actuating said recording mechanism to print from said printing indicia and said line numbering device on a record tape and for simultaneously actuating said type to print on said card and during the same operation actuate the cutting device to form a new shoulder on the card.

16. A machine of the class described comprising a sectional casing, one section of which is movable relative to the other, a payment card having printing indicia associated therewith and adapted to be inserted between said sections, said card being provided with a preformed stop shoulder, recording mechanism including a platen carried by one of the sectional casings and provided with a longitudinally disposed guide, type and a carrier therefor reciprocably mounted in the other casing section, a cutting device carried by the type carrier and including a punch and socket head slidably mounted in the guide, a spring operatively connected with the punch and socket head, said type carrier being movable to operative position by engagement of the shoulder on the card with said socket head, and means for simultaneously actuating said recording mechanism and said type to print said indicia on a record tape and to print said type on said card and during the same operation actuate the cutting device to form a new stop shoulder on the card when the sections of the casing are pressed together.

17. A machine of the class described comprising a sectional casing adapted to receive between the sections thereof a payment card having printing indicia associated therewith, said payment card being provided with a stop shoulder, recording mechanism including a platen disposed within one of the casing sections, type and a carrier therefor reciprocably mounted in another casing section and movable to a selected printing position by engagement with the stop shoulder on the card when said card is inserted within the casing and moved to a predetermined position, a spring operatively connected with the type carrier for normally and yieldably holding said type carrier in a forward position, loops formed on the type carrier, a belt connected with the loops and movable over the platen, said belt being provided with printing numerals, a notching cutter mounted on the type carrier and movable with said type carrier rearwardly of the casing by engagement with the stop shoulder on the payment card, and means for actuating said recording mechanism to print from said printing indicia and said printing belt on a record tape and for simultaneously actuating said type to print on said card and during the same operation actuate the cutting device to form a new shoulder on the card.

18. A device of the class described comprising upper and lower casing sections, one of which is movable relative to the other and adapted to receive a payment card between them, said card having printing indicia associated therewith and provided with a lateral stop shoulder, recording mechanism including a platen, a spring-actuated type carrier slidably mounted on one of the casing sections, a type carrier belt operatively connected with the type carrier and movable over said platen, a notching cutter mounted on the type carrier and comprising coacting cutting elements, one of which constitutes a stop shoulder for engagement with the shoulder on the card, and means for actuating said recording mechanism to print from said printing indicia and said type carrying belt on a record tape and for simultaneously actuating said type to print on said card and during the same operation actuate the cutting device to form a new shoulder on the card.

19. A machine of the class described comprising a casing having a movable cover and adapted to receive a shouldered payment card between the casing and cover, said card having printing indicia associated therewith, a card supporting a platen table disposed within the casing and provided with a longitudinal seat having an opening therein, recording mechanism arranged at the rear of the table, a type carrier slidably mounted within the cover and provided with dating mechanism, and a receipt impression plate, a guide rod for said carrier, a spring surrounding the rod and bearing against the type carrier for normally and yieldably holding said type carrier in a forward position, a cutting device carried by the type carrier and comprising a punch and a lower socket member, said socket member being provided with an opening to receive the payment card and having a base fitting within the seat of the table, the rear wall of said socket member constituting a stop for engagement with the shoulder on the payment card, a spring connecting the punch member and socket member, and means for actuating said recording mechanism to print from said printing indicia on a record tape and for simultaneously actuating said type and said dating mechanism to print on said card and during the same operation actuate the cutting device to form a new shoulder on the card.

20. A machine of the class described comprising a casing and a cover therefor having a limited opening movement and adapted to receive a shouldered payment card between the casing and cover, said payment card having printing indicia associated therewith, recording mechanism including a platen, a movable type carrier slidably mounted in the casing, a cutting device carried by the type carrier and including coacting elements, one of which is provided with an abutment for engagement with the shoulder on the payment card, means depending from the cover and operatively connected with the recording mechanism for moving a record tape over the platen when the cover is partially opened, means for simultaneously actuating said recording mechanism and the type on the carrier to print said indicia on the record tape and to print said type on said card and during the same operation actuate the cutting device to form a new shoulder on the card when the cover is moved to closed position, and a key locking device operatively connected with the recording mechanism and including a pin movable by the key in one direction to limit the opening movement of the cover and in another direction to permit the cover to be moved to full open position.

21. A machine of the class described comprising a sectional casing adapted to receive a shouldered payment card between the sections thereof, said card having printing indicia associated therewith, recording mechanism including a platen mounted in one of the sections, a movable type carrier mounted for sliding movement in the other casing section, loops formed on the type carrier, a plurality of numbering disks mounted on said type carrier provided with transverse grooves, a spring locking bar adapted to engage the grooves for preventing accidental rotation of the disks, a receipt plate forming a part of the movable carrier, a line numbering belt connected with the loops and movable over the platen, a notching cutter carried by and mounted at one side of the type carrier, an inking ribbon movable over the receipt plate and numbering disks, said notching cutter including a socket member having an opening in one side thereof for the reception of the payment card and provided with a rear wall constituting a stop for engagement with the shoulder on said card, and means for actuating the recording mechanism and the type on the carrier to print said indicia on a record tape and to print said type on said card and simultaneously operate the notching cutter to form a new shoulder on the card when the sections of the casing are pressed together.

22. A collector's recorder comprising a portable box having a pivoted cover to permit the insertion of a perforated payment card having printing indicia associated therewith, a combined supporting table and platen disposed within the box and provided with an upstanding stop pin adapted to enter a perforation in the payment card, recording mechanism arranged within the box, type and a type carrier therefor reciprocably mounted in said box and movable to a selected printing position by engagement with a portion of the card when said card is inserted within the casing and moved to a predetermined position, a notching cutter mounted on the type carrier, means for simultaneously actuating the recording mechanism and said type to print said indicia on a record tape and to print said type on said card and during the same operation actuate the cutter to cut a shoulder in said card when the cover of the box is moved to closed position, and a key actuated lock mounted on the box and cooperating with the cover for limiting the opening movement of said cover when the key is turned in one direction and permitting complete opening movement of the box when the key is turned in another direction.

23. A machine of the class described including a casing adapted to receive a card having printing indicia associated therewith, type and a carrier therefor reciprocably mounted in the casing and movable to a selected printing position by engagement with the card when said card is inserted within the casing and moved to a predetermined position, a notching cutter mounted on the type carrier, recording mechanism within the casing, and means for simultaneously actuating said recording mechanism and said type to print said indicia on a record tape and to print said type on said card and during the same operation actuate the notching cutter to form a stop on said card.

24. A machine of the class described comprising a casing adapted to receive a card having printing indicia associated therewith and provided with a stop shoulder, a spring actuated type carrier reciprocably mounted within the casing, a notching cutter mounted on the type carrier and comprising coacting cutting elements, one of which constitutes a stop shoulder for engagement with the shoulder on the card, recording mechanism, and means for simultaneously actuating said recording mechanism and the type on the carrier to print said indicia on a record tape and to print said type on said card and during the same operation actuate the cutting device to form a new stop shoulder on the card.

25. A machine of the class described including a casing adapted to receive a card having printing indicia associated therewith, type and a holder therefor mounted in the casing, said card and holder being relatively movable to a selected printing position by engagement of the holder with a portion of the card when said card is inserted within the casing and moved to a predetermined position, impression mechanism within the casing, and means for simultaneously actuating said impression mechanism and said type to print said indicia on a record tape and to print said type on said card at a position determined by the engagement between said portion of the card and said holder.

26. A machine of the class described including a casing adapted to receive a card having printing indicia associated therewith, type and a holder therefor mounted in the casing, said card and holder being relatively movable to a selected printing position by engagement with a portion of the card when said card is inserted within the casing and moved to a predetermined position, a shoulder cutting device having a card stop associated therewith, impression mechanism within the casing, and means for simultaneously actuating said impression mechanism, type, and cutting device to print said indicia on a record tape and to print said type on said card and form a stop shoulder on the card upon each insertion of the card within the casing to a position in contact with said card stop whereby the card indicia is recorded on the tape and the type impression is recorded on the card in a new position for each reinsertion of the card.

JAMES EDWIN HAYNES.